United States Patent [19]

Hartmann

[11] 4,076,452
[45] Feb. 28, 1978

[54] GAS TURBINE PLANT

[75] Inventor: Max Hartmann, Baden, Switzerland

[73] Assignee: Brown, Boveri-Sulzer Turbomaschinen AG, Zurich, Switzerland

[21] Appl. No.: 737,515

[22] Filed: Nov. 1, 1976

Related U.S. Application Data

[63] Continuation of Ser. No. 559,718, Mar. 19, 1975, abandoned.

[30] Foreign Application Priority Data

Apr. 9, 1974 Switzerland ............... 4978/74

[51] Int. Cl.² .................. F01B 25/24; F02C 7/20
[52] U.S. Cl. .................. 415/219 R; 60/39.31
[58] Field of Search ........... 60/39.31, 39.32, 39.08; 415/116, 117, 142, 219 R

[56] References Cited

U.S. PATENT DOCUMENTS

| 2,484,952 | 10/1949 | Ledwith | 60/39.32 |
| 2,616,662 | 11/1952 | Mienley | 215/219 R |
| 2,759,700 | 8/1956 | Wheatley | 415/116 |
| 3,751,909 | 8/1973 | Kohler | 415/117 |
| 3,837,164 | 9/1974 | Carr | 60/39.32 |

FOREIGN PATENT DOCUMENTS

502,139   4/1951   Belgium ............... 60/39.31

*Primary Examiner*—Carlton R. Croyle
*Assistant Examiner*—L. T. Casaregola
*Attorney, Agent, or Firm*—Burns, Doane, Swecker & Mathis

[57] ABSTRACT

A stationary gas turbine plant in which a bearing for the bladed rotor is located at the exhaust end of the casing where the flow passage for the exhaust gas merges into an annular diffusor ring surrounding the bearing housing and which is established by radially spaced circular walls interconnected by means of an array of circumferentially spaced radially extending aero-foil shaped ribs. Two of these ribs extending divergently in a generally downward direction toward the foundation for the turbine are made hollow for the purpose of passing support struts through them, the upper ends of these struts being secured to the bearing housing and the lower ends of the struts being secured to the foundation. Additional supports are provided at opposite sides of the casing at the exhaust end, these supports also being secured to the foundation. The two downwardly directed hollow ribs and the two additional supports for the casing incorporate ducts through which a fluid coolant is circulated, and the coolant which passes through the two hollow ribs enters the bearing casing. The coolant can be ambient air, or gland sealing air, or the bearing lubricant and it can also be the same fluid as is used for cooling the rotor.

2 Claims, 4 Drawing Figures

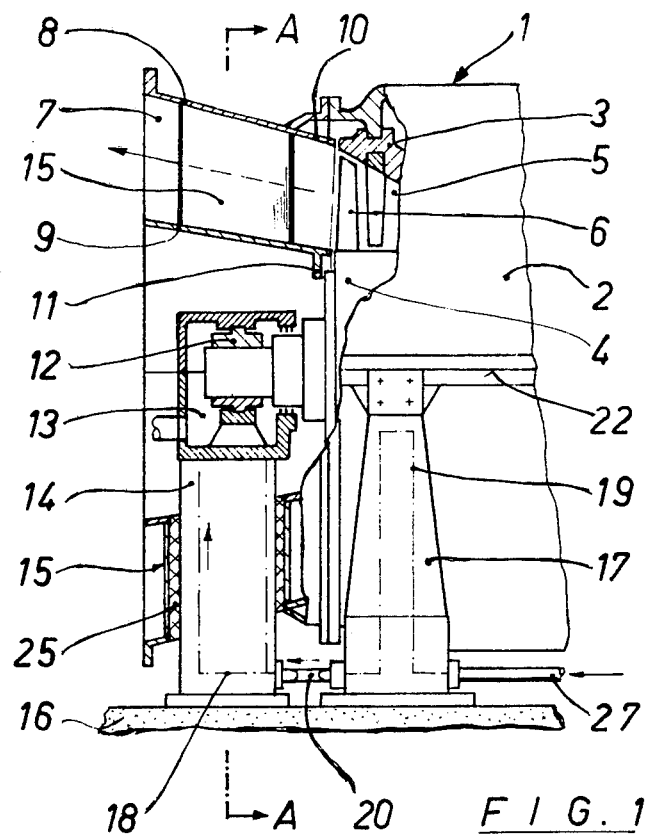
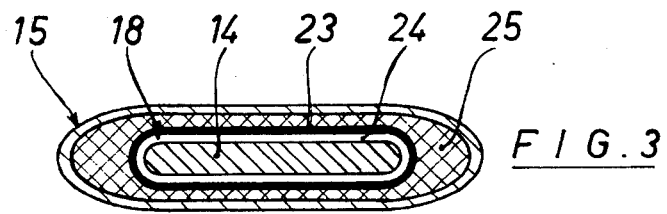
FIG. 1
FIG. 3

GAS TURBINE PLANT

This is a continuation, of application Ser. No. 559,718 filed Mar. 19, 1975 (abandoned).

The present invention concerns a stationary gas turbine plant having a bearing for the rotor at the exhaust end of the casing and the flow passage of the gas turbine merges into an outlet diffusor ring, the outer and inner peripheral walls of which are supported with respect to each other by means of aerofoil-shaped ribs and the bearing of the rotor is located within the hollow space of the inner peripheral wall.

For reasons of fluid dynamics and in order better to influence efficiency, gas turbine installations are fitted with relatively long oulet diffusors extending preferably in the axial direction. For these reasons, which take account of economic circumstances, it is necessary on technical grounds to support the exhaust-end bearing of the turbine rotor on the turbine casing. Because the casing and rotor have to meet different requirements (the casing must be free to expand, whereas the rotor should not move), manufacturers of gas turbines are repeatedly faced with problems.

In the case of the exhaust cone of a jet engine fitted with streamlined spokes attached to the outer casing, for example, a known method consists in locating a shaft bearing in the cone, the bearing ring being supported in radial planes on the outer casing by means of rods inserted in the exhaust cone and able to expand (Swiss Pat. No. 268 648).

In this way the dynamic forces, and also the forces of expansion, are transferred from the exhaust diffusor to the outer casing. In a power-generating plant, this casing is in turn fixed by means of feet or flexible supports to the foundation, which normally has to absorb all stresses.

In non-steady operation, as often occurs in gas turbine power stations for peak-lopping duty, the casings are subjected to thermal stresses and differential expansions which then lead to variations in the clearance between rotor and casing, and also influence the shafts or rotor supports. This can give rise to damage to the bearings and seals, and can even cause blade failure. These disadvantages are more pronounced at high temperature and when the casing dimensions are large.

Another known method consists in making the exhaust diffusor a component completely separate from the outer casing of the turbine, the outer and inner annular wall of the diffusor being joined by way of connecting elements capable of compensating expansion, and the end bearing of the rotor being supported inside the inner annular wall of the diffusor and sealed from the exhaust duct (German Pat. No. 768 036).

With this construction also, shaft movements can occur owing to differential expansion. High thermal stresses occur at the thermally responsive junctions between exhaust diffusor and outer casing, which in addition aggravate the sealing problem.

The object of the invention is to create a gas turbine plant of the kind described above which renders the method of supporting the bearing at the exhaust end independent of the influences due to thermal stress and expansion of the outer casing and of the exhaust diffusor ring.

This object is achieved in that supporting struts pass through the hollow ribs, the ends of these struts being attached at one end to the bearing housing and at the other end to the machine foundation, and in that the exhaust end of the gas turbine casing is firmly fixed to the foundation by way of separate supporting elements.

This has the advantage that the manner of supporting the outer casing is completely separate from the manner of supporting the rotor with respect to the foundation, these eliminating the former interrelationships between the two components. In addition, the dynamic forces originating from the rotor are no longer exerted on the casing of the gas turbine. Separating the means of support also improves access to certain components, since in the event of a bearing inspection or overhaul it is no longer necessary to open the casing.

In an alternative form of the invention the supports of the exhaust-end bearing and the load-bearing elements of the casing incorporate ducts, or are surrounded by ducts, which in turn are connected to a supply of coolant.

Efficient cooling can be achieved with a gas turbine plant of this configuration, thus allowing greater shaft weights at high exhaust-gas temperatures without impairing reliability. In this way the range of application of gas turbines of the kind described can be extended by virtue of the invention.

Furthermore, by cooling the supports of the bearing and the supporting elements of the casing independently of each other it is possible to influence the relative position of rotor and outer casing. At the same time, the bearing lubricant can be used as the coolant.

However, it is also possible to employ the rotor cooling air, the gland sealing air or air from an external source for cooling the supports, in which case the hollow supports act as air ducts.

The invention will now be explained in more detail with reference to the drawings, in which:

FIG. 1 shows a longitudinal section through a gas turbine at the exhaust end,

FIG. 3 is a cross-section through the supporting element or the struts.

Identical components in the various drawings are identified by the same reference numbers.

Figure 2:
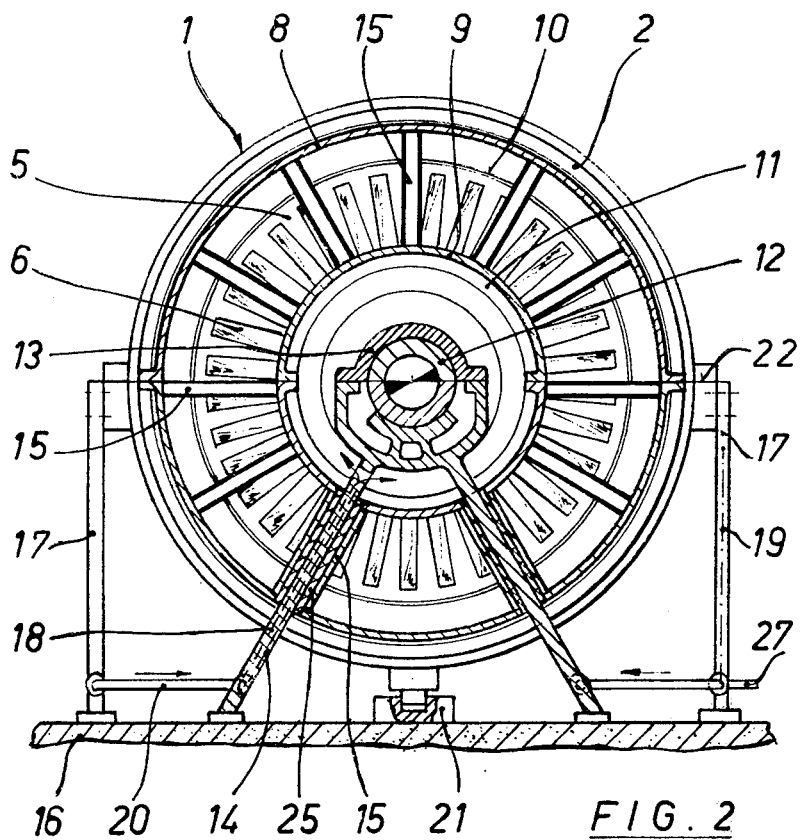
FIG. 2 is a cross-section at the line A—A of FIG. 1 and viewed in the direction of the arrows.

FIG. 1 shows the exhaust end of a gas turbine 1. The casing 2 contains the fixed-blade carriers 3 which, together with the outer contour of the rotor 4, form the flow passage 5. Blades 6 are fitted in the rotor 4 and the fixed-blade carrier 3. The annular exhaust duct 7 is connected to the casing 2, the outer annular wall 8 and inner annular wall 9 of this duct being joined together by a number of radial ribs 15. The annular exhaust duct 7 is provided with sealing strips 10 and 11 which enclose the flow passage 5.

The space within the inner annular wall 9 contains the bearing 12 for the rotor 4. This is mounted in bearing housing 13.

The ribs 15 in the annular exhaust duct 7 are of aerofoil section and are partly hollow. Struts 14, which are rigidly attached to the foundation 16 and the bearing housing 13, extend through the hollow ribs 15 in the bottom part of the annular exhaust duct 7. Ducts 18 for conveying the coolant or lubricants are indicated in struts 14 by chain-dotted lines.

The casing 2 of the gas turbine is supported directly on the foundation 16 by means of supporting elements 17. The supporting elements 17 are in the form of flexible supports so that the casing 2 can expand freely in radial planes, and directionally in axial planes. Connected to supporting element 17 is a pipe 27 which carries the coolant flowing in the cooling ducts 19 of the supporting element 17. Between the supporting element 17 and the struts 14 there is a connecting pipe 20 which carries the coolant to the bearing housing 13 or to the ducts 18.

FIG. 2 shows a cross-section through the annular exhaust duct 7, illustrating the clear separation between support of the casing by means of elements 17, and support of the rotor by struts 14. The casing 2 is shown as having a keyway 21 for fixing the axial median plane of the casing.

Two struts 14 are conveniently employed to support the bearing housing 13. However, one or more struts 14 could be provided, in which matching of the struts 14 to each other and with respect to the foundation 16 must be taken into account. The supporting elements 17 are attached to the casing 2 in the vicinity of the dividing plane 22, their other end being anchored to the foundation 16.

A cross-section of the strut 14 as shown in FIG. 1 is depicted in FIG. 3. The strut 14 is accommodated in the hollow rib 15, the strut 14 being enclosed in a tubular jacket 23. Between the tubular jacket 23 and the strut 14 there is a gap 24 which forms the duct 18 for the coolant.

The remaining space between tubular jacket 23 and the profile of rib 15 is filled with insulating material 25.

Figure 4:
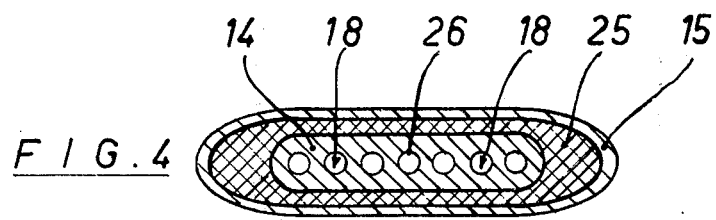
FIG. 4 shows an alternative version of FIG. 3.

An alternative form is shown in FIG. 4; here the cooling ducts 18 are formed by holes 26 running through strut 14. The space remaining between the hollow rib 15 and the strut 14 is filled completely with insulating material 25.

The beneficial action of the bearing support assembly 12 – 14 results from passing the coolant through the ducts 18 and the fact that these are linked to the corresponding cooling ducts 19 of the supporting elements 17. The coolant introduced via supply line 27 flows through the cooling duct 19 of supporting element 17 and passes through the connecting pipe 20 and ducts 18 to the bearing housing 13.

When air is used as the coolant, this is blown into the space enclosed by the inner annular wall 9 and cools not only the bearing 12, but also the annular exhaust duct 7. The heated air can then be discharged to the stack (not shown) or used for another purpose, e.g. to remove the heat passing through the insulation or by way of the gland-sealing gas into the space enclosed by annular wall 9.

The necessary quantity of cooling air is conveniently drawn either from the rotor cooling air or from the gland sealing air if the gas turbine is of the air-cooled type. However, ambient air or air from an existing compressed air network can also be used for cooling. On the other hand, it is quite possible to employ the lubricant of bearing 12 for cooling purposes, instead of air. The lubricant can also be fed to the bearing 12 via the ducts 18 of struts 14 without at the same time using the lubricant as a coolant. This has the advantage that no separate flow and return lines have to be provided.

It has also been found beneficial to make the struts 14 or the supporting elements 17 of invar steel, as in this way it is possible to influence the transient differences in expansion.

I claim:

1. In a stationary gas turbine supported upon a foundation having a bearing for the turbine rotor at the exhaust end of the turbine casing and wherein the flow passage through the gas turbine merges into an outlet diffusor ring, the outer and inner peripheral walls of said diffusor ring being supported with respect to each other by means of aerofoil-shaped ribs, and the bearing and its housing being located within a hollow space established within the inner peripheral wall, the improvement wherein a support structure solely for the bearing in the form of struts passes through said ribs which are hollow, the inner ends of said struts being secured to the bearing housing and the outer ends thereof to the foundation, and a second support structure completely independent of said bearing support structure and constituted by support elements located at opposite sides of the turbine casing securing the turbine casing to the foundation serves as the sole support for said casing.

2. A stationary gas turbine as defined in claim 1 wherein the struts of the support structure for the bearing and the support elements of said second support structure for the turbine casing incorporate ducts through which the same fluid coolant is circulated.

* * * * *